(12) United States Patent
Barnard

(10) Patent No.: US 6,545,639 B1
(45) Date of Patent: Apr. 8, 2003

(54) SYSTEM AND METHOD FOR PROCESSING CORRELATED CONTACTS

(75) Inventor: Thomas J. Barnard, Liverpool, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/973,648

(22) Filed: Oct. 9, 2001

(51) Int. Cl.⁷ .................................................. G01S 3/16
(52) U.S. Cl. ...................................................... 342/378
(58) Field of Search ............................... 342/378, 382, 342/383

(56) References Cited

U.S. PATENT DOCUMENTS

| | | | | |
|---|---|---|---|---|
| 4,644,562 A | * | 2/1987 | Kavehrad et al. | 375/14 |
| 5,251,186 A | | 10/1993 | Lockwood | 367/103 |
| 5,510,796 A | * | 4/1996 | Applebaum | 342/162 |
| 5,610,612 A | | 3/1997 | Piper | 342/195 |

OTHER PUBLICATIONS

"Active Adaptive Processing", Phase 3, Final Report, May 20, 1994 (78 pp).

* cited by examiner

Primary Examiner—Dao Phan
(74) Attorney, Agent, or Firm—Duane Morris LLP

(57) ABSTRACT

A system and process for maintaining correlated contacts (e.g., sonar/radar contacts) utilizes diagonal averaging. A covariance matrix is formed from signals received by an array of sensors. These sensors may be acoustic and/or electromagnetic sensors. The covariance matrix is replaced with Toeplitz matrix. The Toeplitz matrix is a Toeplitz matrix that most closely matches the covariance matrix in the least squares sense. The Toeplitz matrix is used to calculate weight vectors for the adaptively formed response signals.

29 Claims, 7 Drawing Sheets

SYSTEM AND METHOD FOR PROCESSING CORRELATED CONTACTS

FIELD OF THE INVENTION

The present invention is generally related to sensor systems, and more specifically related to a system and method for maintaining correlated sonar and/or radar contacts.

BACKGROUND

In a typical active sonar/radar system, acoustic/electromagnetic signals are transmitted through a medium (e.g., water for sonar, air for radar) toward a target area and acoustic/electromagnetic returns (e.g., echoes) from the target area are received by receiving elements (e.g., sensors) and processed for display. In a passive system, no signals are transmitted. Thus, energy radiating from the target area is processed for display. Typically, detection and localization of a target of interest (also referred to as a contact) comprises determining the range and bearing to the target.

Many conventional systems use arrays of sensors and adaptively beamform the data received by the sensors to detect and/or localize targets of interest. However, traditional adaptive beamformers are known to cancel correlated contacts received by the system at approximately the same time. An example of such correlated contacts is multiple active echoes received by the system at the same time. In contrast, uncorrelated contacts are not cancelled.

Prior art attempts to maintain (also referred to as preserve) correlated contacts include spatial averaging techniques. However, traditional spatial averaging techniques suffer several disadvantages. Spatial averaging techniques tend to degrade array gain, thereby degrading detection and localization performance. Also, the matrices resulting from spatial averaging techniques are often cumbersome to manipulate and require extensive processing capability. Thus, a need exists for a system and process for preserving correlated contacts that overcome the herein-described disadvantages.

SUMMARY OF THE INVENTION

A system and method for processing received sensor array signals, which are indicative of correlated contacts, include forming a covariance matrix representation of elements associated with the received sensor array signals and adapting the covariance matrix representation of elements to obtain a Toeplitz matrix representation of elements. The Toeplitz matrix representation of elements is processed to obtain a response signal, which is indicative of a location of at least one of the correlated contacts.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTIONS

Figure 1:
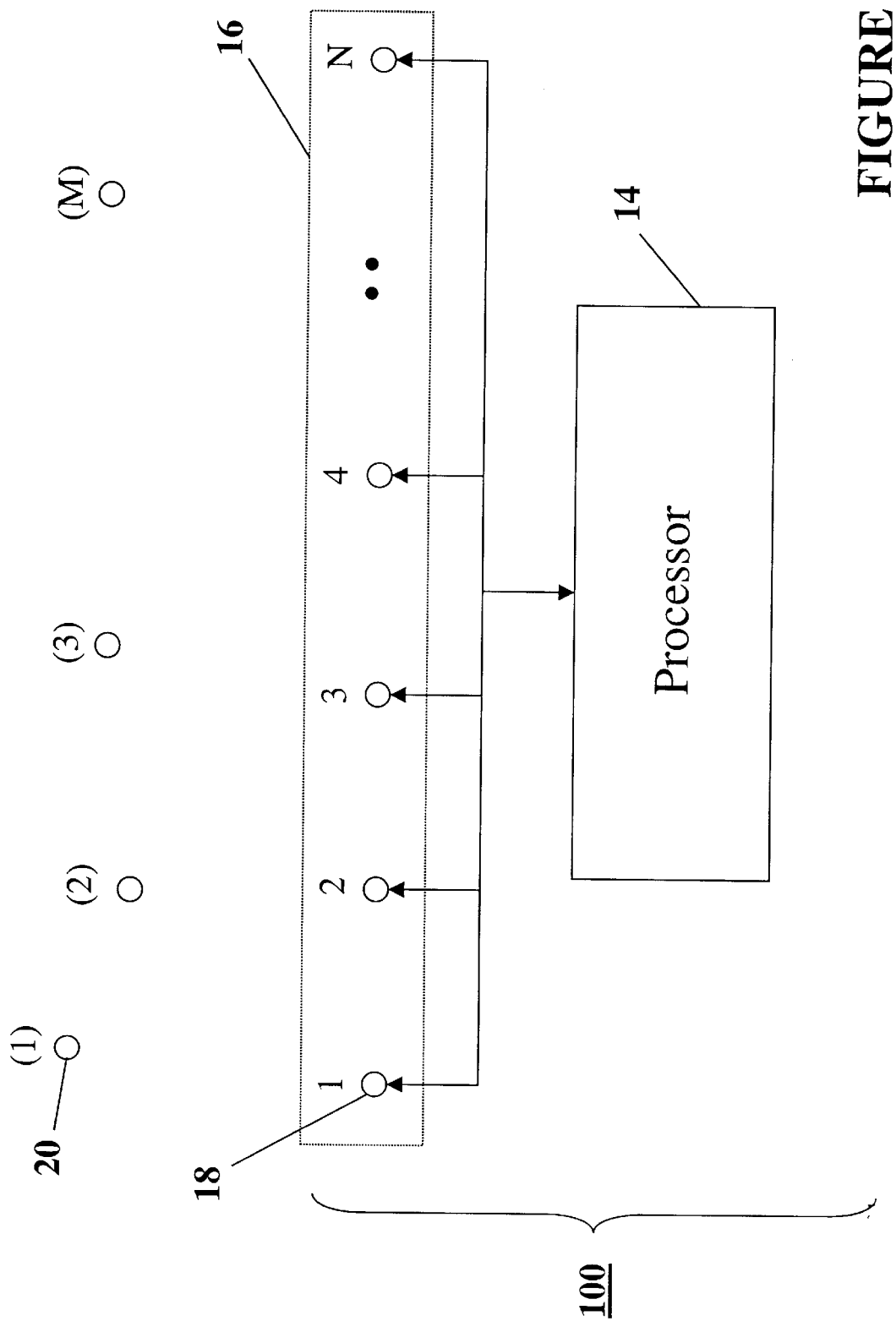
FIG. 1 is a block diagram of an exemplary system for preserving contacts, in accordance with an embodiment of the present invention.

FIG. 1 is a block diagram of an exemplary system 100 for preserving contacts 20, in accordance with an embodiment of the present invention. System 100 comprises a processor 14 and an array 16 of sensors 18. Processor 14 may comprise any type of processor such as a computer processor, a personal computer, and/or a special purpose processor. As shown in FIG. 1, array 16 is depicted as a linear array of sensors 18 comprising N sensors. Array 16 may comprise configurations other than a linear array of sensors 18, such as a planar array of sensors, for example. As described herein, sensors 18 comprise acoustic transducers (for Sonar applications, for example), which convert acoustic energy to electrical signals and electrical signals to acoustic energy. However, it is understood that the processes and systems described herein also apply to systems comprising electromagnetic (for Radar applications, for example) and optical (for infrared and visible light applications, for example) sensors. Contacts 20, comprise M contacts. Contacts 20 may also be referred to a targets of interest. Targets of interest for undersea acoustic applications include, for example, vessels such as submarines or surface ships, biologic organisms, or other masses, or objects capable of acoustic detection (e.g., underwater pinnacles). Contacts 1 through M represent detectable entities, which are detectable by the system 100. Contacts 20 may comprise any number of contacts, thus in an exemplary embodiment of the invention, M=1. Also, contacts 20 may comprise any geometric configuration.

Signals emanating from contacts 20 are received by array 16. The signals may be reflected signals (echoes) and/or signals originating from the contacts 20. It is not uncommon to desire to detect and maintain detection of all M contacts 20 concurrently. However, if the signals emanating from two or more of the contacts 20 can be modeled as correlated and arising from the same random process, such as occurs with multipath spreading, adaptive beamforming techniques tend to cancel these correlated signals. As understood herein, two signals are correlated if the degree of statistical correlation between the two signals is greater than or equal to approximately ninety percent (90%). This phenomenon is illustrated in FIG. 2.

Figure 2:
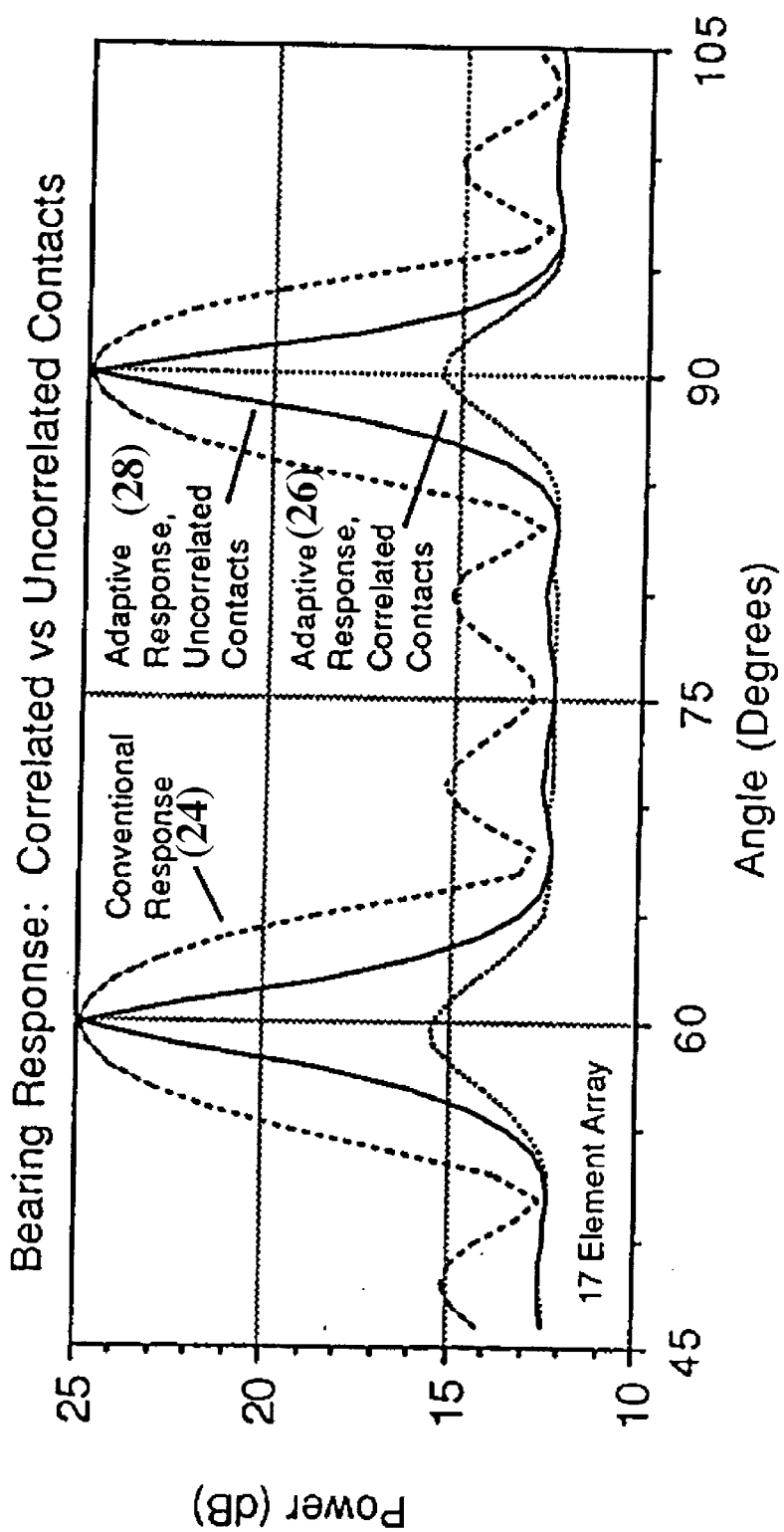
FIG. 2 (Prior Art) is a plot of bearing responses of correlated and uncorrelated contacts.

FIG. 2 is a plot of bearing responses (response signals) from a conventional (non-adaptive) beamforming process 24, an adaptive beamforming process for correlated contacts 26, and an adaptive beamforming process for uncorrelated contacts 28. The curves 24, 26, and 28, represent power, in dB, as a function of bearing angle, in degrees. Curve 24 is a curve of the bearing response formed from a conventional beamformer (i.e., not adaptively formed), and is the same for both correlated and uncorrelated contacts. Thus, as evident from curve 24, conventional beamformers do not tend to cancel correlated contacts, in contrast to adaptive beamformers. However, as is well known in the art, adaptive beamformers have several advantages (e.g., improved bearing resolution) over conventional beamformers and are used in a vast number of applications.

Curve 28 is a curve of the bearing response formed from an adaptive beamformer for uncorrelated contacts. A comparison of curve 24 and curve 28 indicates that the adaptively beamformed response for uncorrelated contacts provides the same gain at its peak as the conventional beamformer response for uncorrelated contacts (i.e., 25 dB). However the peak (mainlobe) of the adaptively formed bearing response 28 is more narrow than the mainlobe of the conventionally formed response 24. Thus, the adaptive beamformer provides better (finer) bearing resolution than the conventional beamformer. Curve 26 is a curve of the bearing response formed from an adaptive beamformer for correlated contacts. As can be seen in FIG. 2, the peak power of the mainlobe for curve 26 (i.e., approximately 15.5 dB) is significantly lower than the peak power of the mainlobe for curves 24 and 28 (i.e., 25 dB).

One attempt to maintain the detection of correlated contacts is to spatially average the covariance matrix of the received signals from correlated contacts. As explain herein in more detail, spatial averaging comprises partitioning an array into a series of sub-arrays, and computing a covariance matrix for each sub-array. However, spatial averaging does not fully maintain correlated contacts (i.e., cause the peak power of the mainlobe response for uncorrelated contacts to be approximately equal to the peak power of the mainlobe response for uncorrelated contacts), and spatial averaging is computationally intensive.

The inventor has discovered that the detection of correlated contacts can be maintained (i.e., the peak power of the mainlobe response for correlated contacts is approximately equal to the peak power of the mainlobe response for uncorrelated contacts) by appropriately modifying the covariance matrix of the received signals from correlated contacts to appear similar to the covariance matrix of the received signals from uncorrelated contacts. Referring again to FIG. 1, assuming all M contacts 20 are correlated (i.e., are received by the array 16 at approximately the same time), the received signal from M correlated contacts by an array comprising N elements is modeled by the following equation.

$$[x_1, x_2, \ldots x_N] = a_1[e_1, e_2, \ldots e_N]_1 + \ldots + a_M[e_1, e_2, \ldots e_N]_M + [n_1, n_2, \ldots n_N], \quad (1)$$

wherein:

$[x_1, x_2, \ldots x_N]$ is an N×1 vector representing the received signals;

$[e_1, e_2, \ldots e_N]_i$ is the $i^{th}$ N×1 vector representing the contact direction vector for each correlated contact, for i=1 through M;

$a_1$ through $a_M$ are the real contact amplitudes for each of contact 1 through M, respectively; and $[n_1, n_2, \ldots n_N]$ is an N×1 vector representing ambient white noise for each of N array elements.

To aid in notation, vectors are represented by underlined and bold font. Thus, equation (1) is rewritten as follows.

$$\underline{x} = a_1 \underline{e}_1 + \ldots + a_M \underline{e}_M + \underline{n} \quad (1)$$

For statistically uncorrelated received signals, $\underline{x}$, and noise, $\underline{n}$, the covariance of the received signals is in accordance with the following equation.

$$\underline{R}_{xx} = E\{\underline{x}\underline{x}^H\} = E\{a_1^2\}\underline{R}_{1,1} + \ldots + E\{a_M^2\}\underline{R}_{M,M} + E\{a_1 a_2\}\underline{R}_{1,2} + E\{a_1 a_3\}\underline{R}_{1,3} + \ldots + E\{a_{M-1} a_M\}\underline{R}_{M-1,M} + \underline{R}_{n,n} \quad (2)$$

wherein, $\underline{R}_{xx}$ is the covariance of the input signal, $\underline{x}$; $E\{\}$ is an operator for determining the expected value of the function within the brackets; the superscript "H" represents the transpose of the vector; and $\underline{R}_{i,j} = \underline{e}_i \underline{e}_j^H$ (where i and j represent numbers), and $\underline{R}_{n,n} = E\{\underline{nn}^H\}$, (i.e., the covariance of the noise).

Equating the expected value of the contact amplitudes, $E\{a_i^2\}$, for i=1, 2, ... M, to unity, and defining $\rho_{i,j}$ as $E\{a_i a_j\}$, results in the following equation.

$$R_{XX} = \left[\sum_{i=1}^{M} R_{i,i}\right] + \left[\sum_{i=1}^{M} \sum_{\substack{j=1 \\ j \neq i}}^{M} \rho_{i,j} R_{i,j}\right] + R_{n,n} \quad (3)$$

Equation (3) has three components: a sum of auto-covariance matrices $$\left[\sum_{i=1}^{M} R_{i,i}\right],$$

a sum of cross-covariance matrices $$\left[\sum_{i=1}^{M} \sum_{\substack{j=1 \\ j \neq i}}^{M} \rho_{i,j} R_{i,j}\right],$$

and a background noise covariance term $\underline{R}_{n,n}$. The cross product component (i.e., the sum of cross-covariance matrices) is the major contributor to the reduction in mainlobe power for correlated contacts. The effects of the cross product component can be observed by again referring to FIG. 2. Curves 26 and 28 are curves of the adaptive beamformer output power, $P_{abf}$, for correlated contacts and uncorrelated contacts, respectively, as a function of bearing angle $\phi$. The adaptive beamformer output power at an angle $\phi$ is in accordance with the following equation.

$$P_{abf} = \frac{N^2}{\underline{e}\phi^H \underline{R}_{XX}^{-1} \underline{e}\phi} \quad (4)$$

wherein, $P_{abf}$ is the adaptive beamformer output power; $\underline{e}\phi$ is the direction vector for angle $\phi$. As evident from analyzing equation (4), as the covariance, $\underline{R}_{xx}$, increases, the power, $P_{abf}$, decreases. Thus, introduction of cross-covariance terms in the equation for covariance, $\underline{R}_{xx}$, decreases the value of power, $P_{abf}$.

For uncorrelated contacts having zero mean amplitude, $\rho_{i,j}$ is equal to zero, and the cross product component drops out of the equation for covariance $\underline{R}_{xx}$. Thus, to preserve (maintain) the correlated contacts (i.e., cause the peak power of the mainlobe response for correlated contacts 26 to be approximately equal to the peak power of the mainlobe response for uncorrelated contacts 28), it is advantageous to accordingly modify the cross term component from the covariance, $\underline{R}_{xx}$, to reduce the adverse effect on beamformer response. For a uniformly spaced linear array comprising N equally spaced elements, the direction vector $\underline{e}_i$ for the $i^{th}$ contact, is in accordance with the following equation.

$$(\underline{e}_i)_k = \exp\left[2\pi j(k-1)\frac{d}{\lambda}\cos\theta_i\right], \text{ for } k = 1, 2, \ldots N \quad (5)$$

wherein, d is the spacing between adjacent elements of the linear array, $\lambda$ is the wavelength of the received frequency, and $\theta_i$ is the arrival angle of the $i^{th}$ contact. Combining equation (5) with equation (3), the $i^{th}$ auto-covariance component, $\underline{R}_{i,i}$, is in accordance with the following equation.

$$(\underline{R}_{i,i})_{u,v} = \exp\left[2\pi j(u-1)\frac{d}{\lambda}\cos\theta_i\right] \cdot \exp\left[2\pi j(v-1)\frac{d}{\lambda}\cos\theta_i\right] = \quad (6)$$

$$\exp\left[2\pi j(u-v)\frac{d}{\lambda}\cos\theta_i\right], \text{ for } u, v = 1, 2, \ldots N$$

As evident from equation (6), the $(u,v)^{th}$ element of the auto-covariance matrix, $\underline{R}_{i,i}$, is a function of the difference of u and v (i.e., u−v). Further, all values down a given diagonal of the auto-covariance matrix, $\underline{R}_{i,i}$ are equal, thus yielding a Toeplitz matrix.

A Toeplitz matrix is a matrix having all element values in any given diagonal equal to each other. For example, the following matrix is a Toeplitz matrix.

$$T = \begin{bmatrix} s0 & s1 & s2 \\ s1 & s0 & s1 \\ s2 & s1 & s0 \end{bmatrix} \quad (7)$$

As can be seen in the matrix of equation 7, each diagonal has equal element values. The advantages of Toeplitz matrices over non-Toeplitz matrices are well known in the art. One significant advantage is that numerically efficient techniques exist for inverting Toeplitz matrices. This allows a Toeplitz matrix to be updated much more quickly than a non-Toeplitz matrix, which is particularly applicable to active sonar/radar systems.

Again analyzing the combination of equations (5) and (3), the cross-covariance component, $\underline{R}_{i,j}$, is in accordance with the following equation.

$$(\underline{R}_{i,j})_{u,v} = \exp\left[2\pi j\frac{d}{\lambda}\{(u-1)\cos\theta_i - (v-1)\cos\theta_j\}\right] \quad (8)$$

Note that the matrix of equation (8) is not a Toeplitz matrix.

Figure 3:
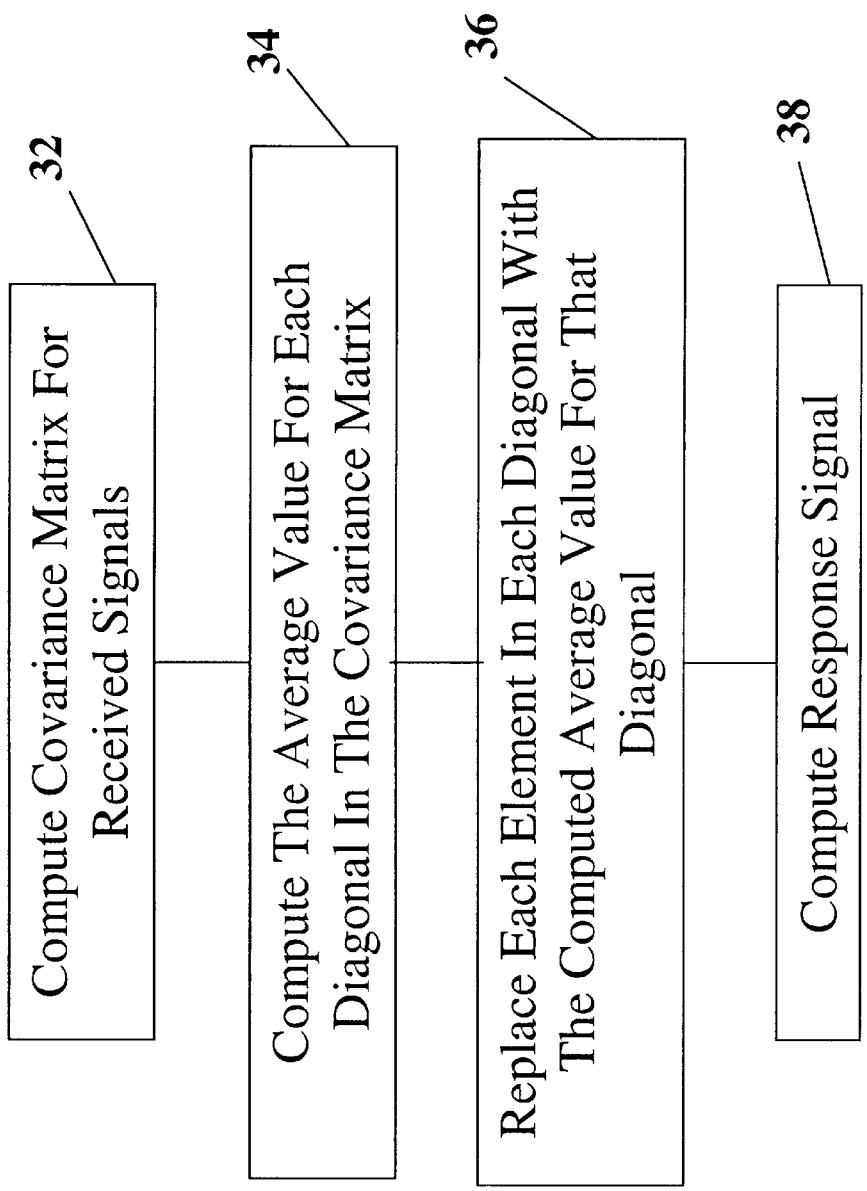
FIG. 3 is a flow diagram of an exemplary process for diagonal averaging the covariance matrix of the received signals in accordance with an embodiment of the invention.
Figure 4:
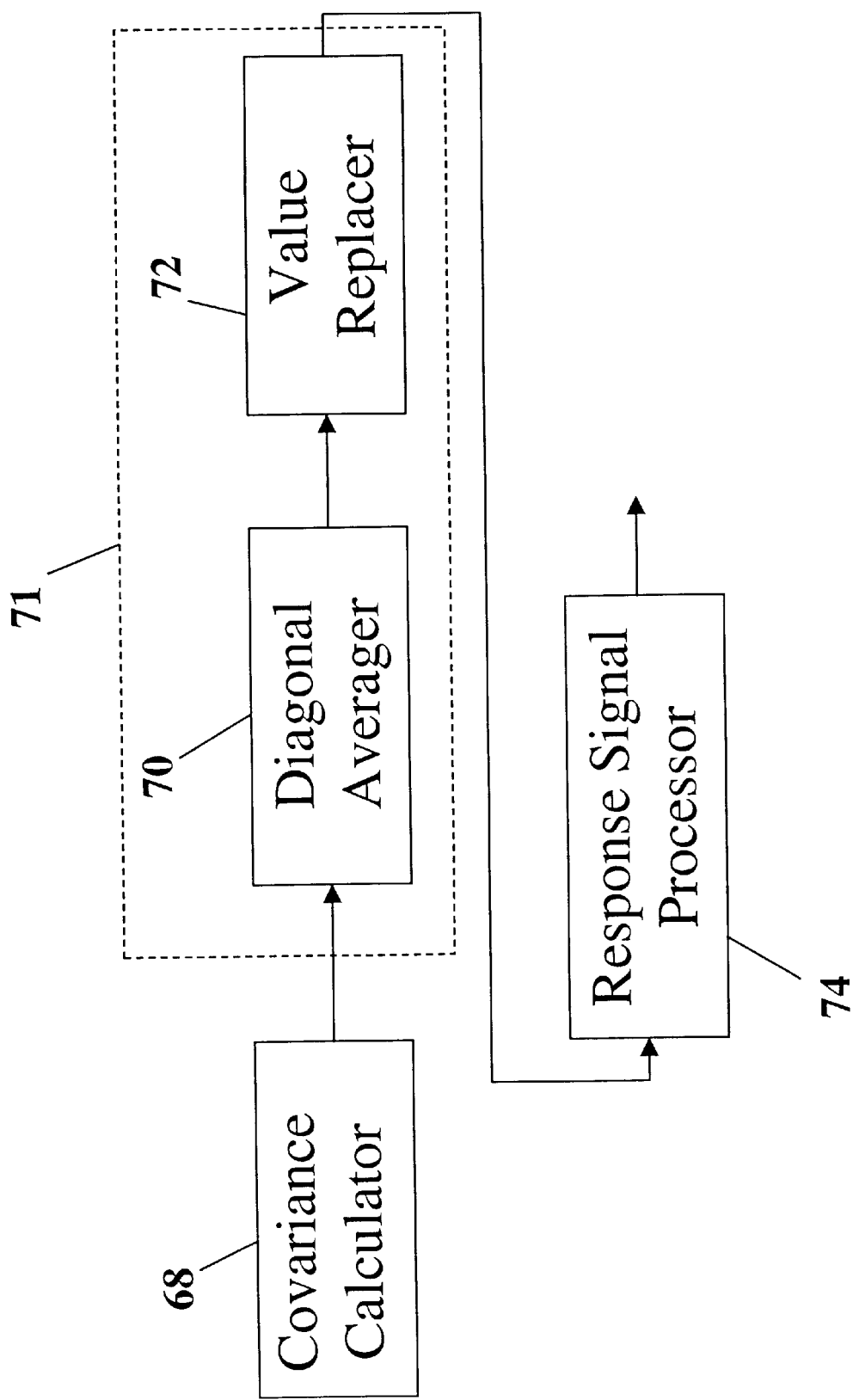
FIG. 4 is a functional block diagram of a system for preserving correlated contacts in accordance with an exemplary embodiment of the present invention.

In an exemplary embodiment of the invention, the covariance matrix, $\underline{R}_{xx}$, is replaced with a Toeplitz matrix that is a least squares approximation of the covariance matrix, $\underline{R}_{xx}$, (i.e., the Toeplitz matrix most closely matches the covariance matrix, $\underline{R}_{xx}$, in the least-squares sense). In one embodiment of the invention, this is accomplished by replacing each value on the diagonal of $\underline{R}_{xx}$ with the average value as computed down that diagonal. FIG. 3 is a flow diagram of an exemplary process for diagonal averaging the covariance matrix of the received signals in accordance with an embodiment of the invention. FIG. 4 is a functional block diagram of an exemplary system for diagonal averaging in accordance with the present invention. At step 32, the covariance matrix, $\underline{R}_{xx}$, for the received signals is computed by covariance calculator 68. In one exemplary embodiment of the invention, this is accomplished by time averaging successive time intervals, or "snapshots", of the outer product of the received data $\underline{x}$ (i.e, $\underline{x}\underline{x}^H$). That is, covariance matrices are formed from the received data, $\underline{x}$, by multiplying $\underline{x}$ by $\underline{x}^H$, to obtain a matrix representation of the product (i.e., outer product), and the covariance matrices formed within successive time intervals are averaged. Covariance calculator 68 may comprise any computer processor and/or software algorithm for operating on the array/matrix of elements to perform the processes of forming a covariance matrix and averaging matrices.

At steps 34 and 36, the covariance matrix, $\underline{R}_{xx}$, is adapted by matrix adapter 71 to form an adapted matrix, which is used to maintain correlated contacts. The average values of all the elements along each diagonal of $\underline{R}_{xx}$ are computed at step 34 by diagonal averager 70. Diagonal averager 70 may comprise any computer processor and/or software algorithm for operating on an array/matrix of elements to perform diagonal averaging. Each element in a particular diagonal of $\underline{R}_{xx}$ is replaced by the computed average value for that particular diagonal at step 36 by value replacer 72. Value replacer 72 may comprise any computer processor and/or software algorithm for operating on an array/matrix of elements to perform the process of replacing elements in a array/matrix. The adapted (diagonally averaged and replaced) covariance matrix is used to compute the response signal at step 38 by response signal processor 74.

Because the auto-covariance component, $\underline{R}_{i,i}$, of $\underline{R}_{xx}$ is a Toeplitz matrix, diagonal averaging and replacing in accordance with the present invention does not effect this auto-covariance component. The reason being that the average value of a diagonal in a Toeplitz matrix is equal to the value of any element in that diagonal, because all elements in the diagonal are equal. However, the cross-covariance components, $\underline{R}_{i,j}$, is effected. Averaging down the diagonal attenuates the cross-covariance components, $\underline{R}_{i,j}$, due to the varying phase components on a given diagonal. The effects of diagonal averaging may be observed in FIG. 5.

Figure 5:
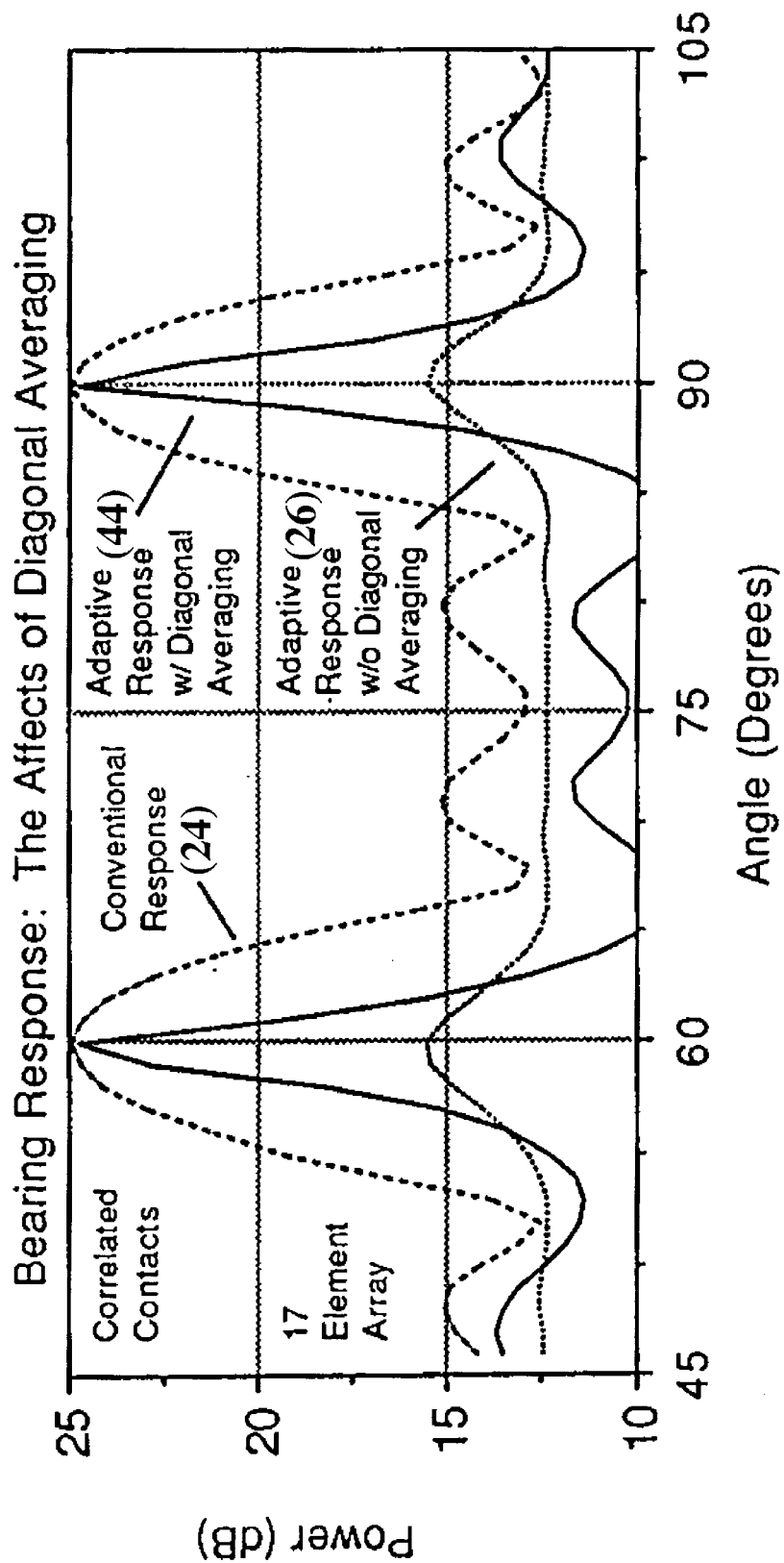
FIG. 5 is a graph of exemplary bearing responses from a conventional beamforming process, an adaptive beamforming process for correlated contacts utilizing diagonal averaging in accordance with the present invention, and an adaptive beamforming process for correlated contacts without diagonal averaging in accordance with the present invention.

FIG. 5 is a graph of exemplary bearing responses (response signals) from a conventional (non-adaptive) beamforming process 24, an adaptive beamforming process for correlated contacts utilizing diagonal averaging in accordance with the present invention 44, and an adaptive beamforming process for correlated contacts without diagonal averaging in accordance with the present invention 26. The curves 24, 26, and 44, represent power, in dB, as a function of bearing angle, in degrees. Curve 24 in FIG. 5 is the same curve 24 shown in FIG. 2, that is, a curve of the bearing response formed from a conventional beamformer (i.e., not adaptively formed) for both correlated and uncorrelated contacts. Curve 26, in FIG. 5, is the same curve 26 shown in FIG. 2, i.e., a curve of the bearing response formed from an adaptive beamformer for correlated contacts, without diagonal averaging in accordance with the present invention.

A comparison of curve 44 and curve 24 indicates that the adaptively beamformed response 44 for correlated contacts utilizing diagonal averaging in accordance present invention provides the same gain at its peak as the conventional beamformer response 24 (i.e., 25 dB). As can be seen in FIG. 5, the peak power of the mainlobe for curve 26 (i.e., approximately 15.5 dB) is significantly lower than the peak power of the mainlobe for curve 44 (i.e., 25 dB). Thus, FIG. 5 shows that the adaptively beamformed response 44 for correlated contacts utilizing diagonal averaging in accordance with the present invention provides a power increase (array gain) of approximately 9.5 dB (from approximately 15.5 dB to approximately 25 dB) over the bearing response 26 formed from an adaptive beamformer for correlated contacts without diagonal averaging.

Figure 6:
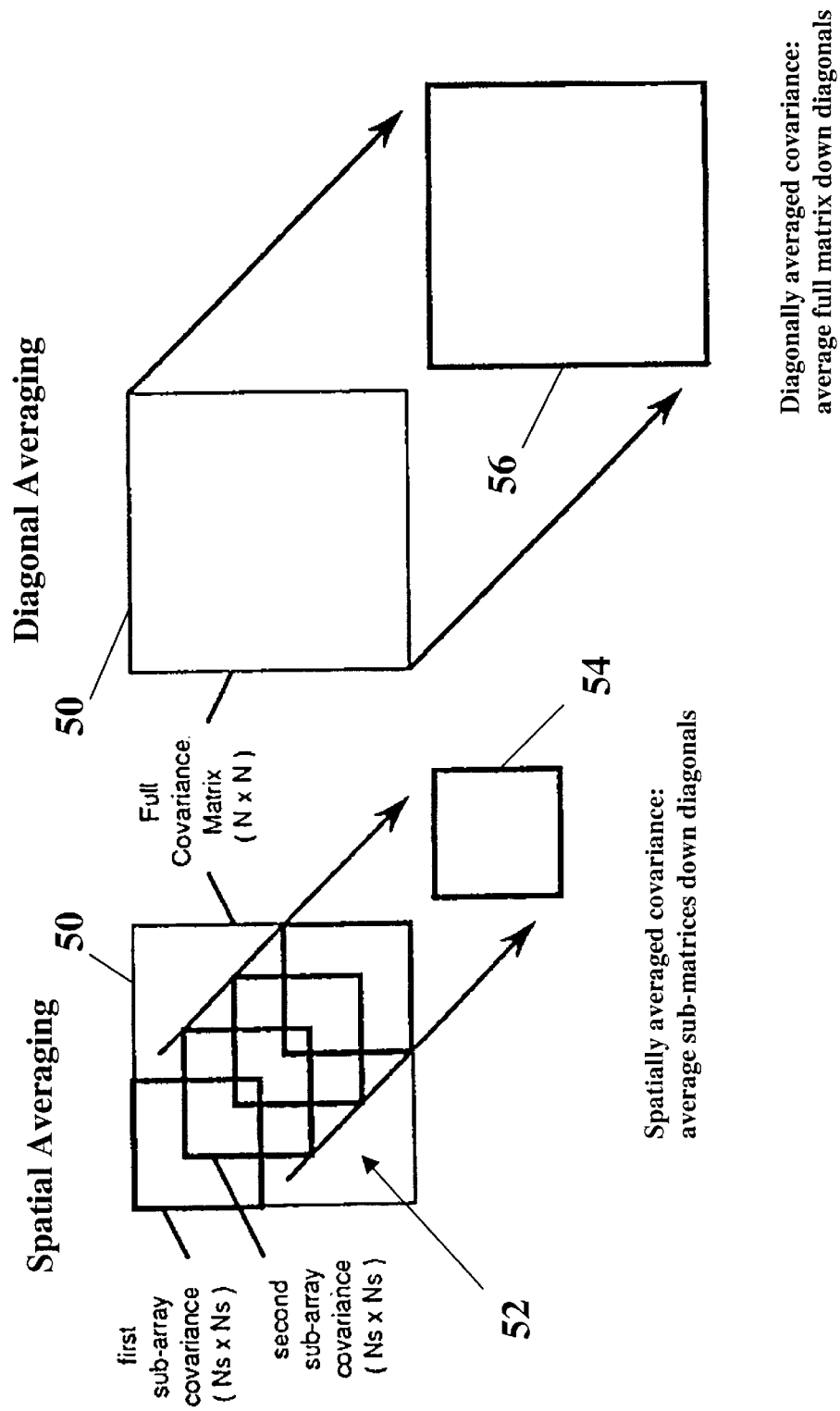
FIG. 6 is a diagram illustrating the concept of spatial averaging compared to an exemplary illustration of diagonal averaging in accordance with the present invention.

Previous techniques used to maintain correlated contacts include spatial averaging. FIG. 6 is a diagram illustrating the concept of spatial averaging compared to an exemplary illustration of diagonal averaging in accordance with the present invention. Spatial averaging comprises partitioning a full array into a sequence of sub-arrays, and computing separate statistics for each sub-array. Thus, in FIG. 6, spatial averaging comprises partitioning the full covariance matrix 50 into a sequence of sub-array covariance matrices 52. Averaging these sub-array covariance matrices 52 down the diagonal of the full matrix 50 forms a resultant spatially averaged covariance matrix 54. Thus, if the size of each sub-array matrix 52 is Ns×Ns (i.e., contains Ns elements in each row and Ns elements in each column), the resultant spatially averaged matrix 54 is also size Ns×Ns. However, if the size of the full matrix 50 is N×N, the matrix 56 resulting from diagonally averaging in accordance with the present invention, is also size N×N, thus maintaining the number or elements. Because the array gain against noise is directly proportional to the number of utilized elements, diagonal averaging yields a higher array gain than spatial averaging, as described in more detail below. Spatial averaging is described in more detail in a document titled, "Active Adaptive Processing Phase 3 Final Report", May 20, 1994, authored by Martin Marietta Ocean, Radar & Sensor Systems, P.O. Box 4840, Syracuse, N.Y. 13221-4840.

Figure 7:
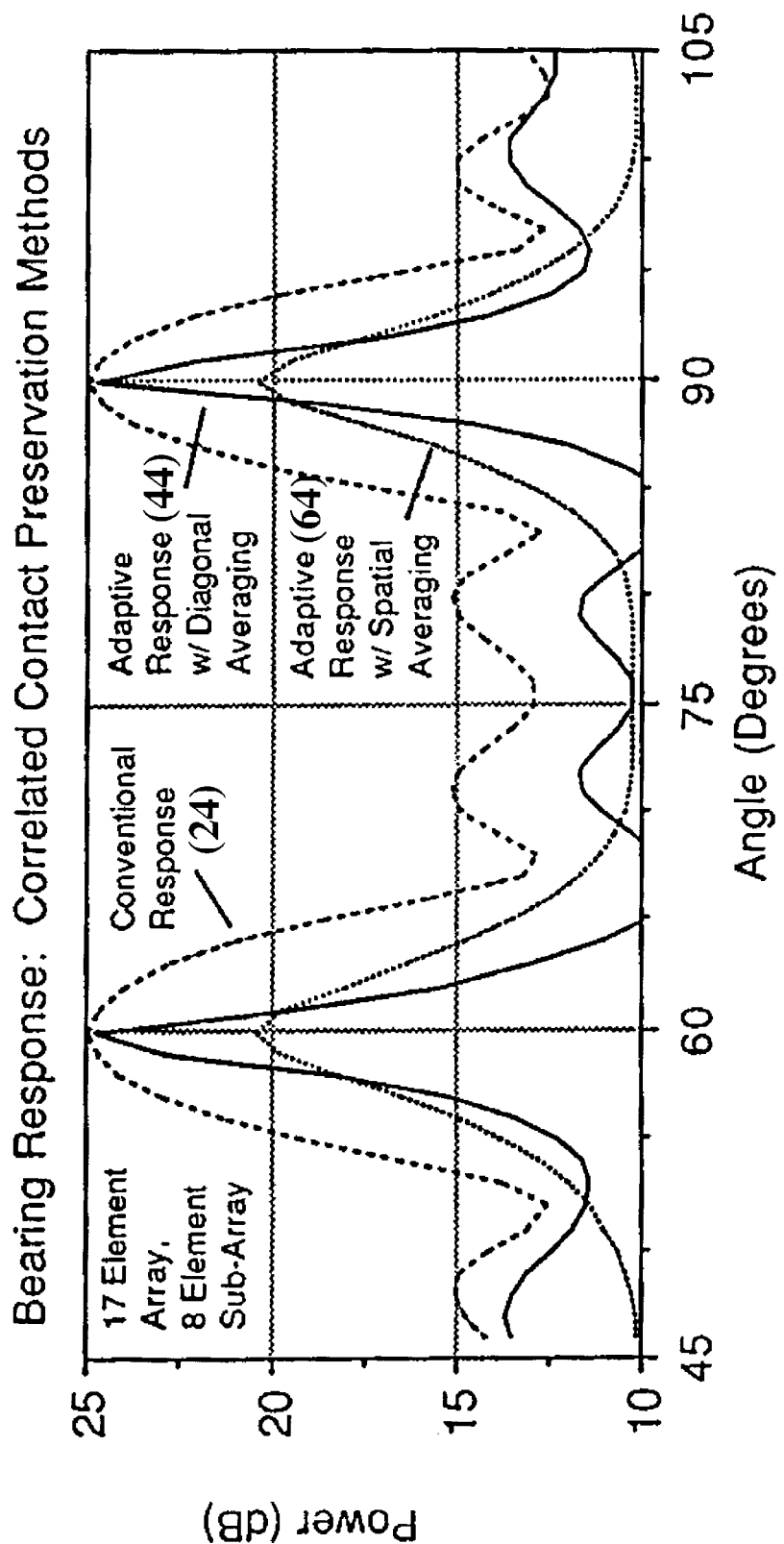
FIG. 7 is a graph illustrating the bearing response provided by spatial averaging and the bearing response provided by diagonal averaging in accordance with an exemplary embodiment of the present invention.

Another advantage of diagonal averaging in accordance with the present invention over spatial averaging is that diagonal averaging provides increased array gain over the array gain provided by spatial averaging. FIG. 7 is a graph illustrating the bearing response provided by spatial averaging and the bearing response provided by diagonal averaging in accordance with an exemplary embodiment of the invention. Curves 24, 44, and 64, represent power, in dB, as a function of bearing angle, in degrees. Curve 24 in FIG. 7 is the same curve 24 shown in FIGS. 2 and 4, that is, a curve of the bearing response formed from a conventional beamformer (i.e., not adaptively formed) for both correlated and uncorrelated contacts. Curve 44, in FIG. 7, is the same curve 44 shown in FIG. 5, that is a curve resulting from an adaptive beamforming process for correlated contacts utilizing diagonal averaging in accordance with the present invention. Curve 64 is a bearing response curve resulting from a spatial averaging process as described herein. A comparison of curve 44 and curve 64 indicates that the peak power of the mainlobe for curve 64 (i.e., approximately 20.5 dB) is significantly lower than the peak power of the mainlobe for curve 44 (i.e., 25 dB). Thus, FIG. 7 shows that the adaptively beamformed response 44 for correlated contacts utilizing diagonal averaging in accordance with the present invention provides a power increase (array gain) of approximately 4.5 dB (from approximately 20.5 dB to approximately 25 dB) over the bearing response 64 formed from an a spatially averaging process as described herein.

Another advantage of diagonal averaging in accordance with the present invention over previous techniques, is the reduced implementation complexity associated with solving for adaptive weight vectors. Because of the redundant structure of Toeplitz matrices, as described herein, and because diagonal averaging in accordance with the present invention utilizes Toeplitz matrices, the equations for the adaptive weight vector are solved in a more efficient manner than in previous techniques. For an N×N Toeplitz matrix, on the order of $N^2$ computations (multiply-adds) are required to solve a system of equations. For an N×N non-Toeplitz matrix, on the order of $N^3$ computations are required to solve the same system of equations.

The present invention may be embodied in the form of computer-implemented processes and apparatus for practicing those processes, wherein processor 14 (see FIG. 1) is a computer processor and the computer-implemented processes are as described herein. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 14, the computer processor 14 becomes an apparatus for practicing the invention. The present invention may also be embodied in the form of computer program code, for example, whether stored in a storage medium, loaded into and/or executed by computer processor 14, or transmitted over some transmission medium, such as over electrical wiring or cabling, through fiber optics, or via electromagnetic radiation, wherein, when the computer program code is loaded into and executed by computer processor 14, the computer processor 14 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for processing received sensor array signals indicative of correlated contacts, said method comprising:
    forming a covariance matrix representation of elements associated with said received sensor array signals;
    adapting said covariance matrix representation of elements by averaging values along a diagonal thereof to obtain a Toeplitz matrix representation of elements; and
    processing said Toeplitz matrix representation of elements to obtain a response signal indicative of a location of at least one of said correlated contacts.

2. A method in accordance with claim 1, wherein said Toeplitz matrix representation of elements is a least squares approximation of said covariance matrix.

3. A method in accordance with claim 1, wherein said response signal is a bearing response signal.

4. A method in accordance with claim 1, further comprising the step of equating an expected value of an amplitude of a received sensor array signal corresponding to each of said correlated contacts to unity.

5. A method in accordance with claim 1, wherein said sensor array comprises one of an array of acoustic sensors, an array of electromagnetic sensors, and an array of optical sensors.

6. A method in accordance with claim 1, wherein said step of adapting said covariance matrix representation of elements with said Toeplitz matrix representation of elements comprises the steps of:
    computing a replacement value for each diagonal in said covariance matrix, each diagonal comprising at least one element value; and
    replacing each element value in each diagonal with said computed replacement value for each respective diagonal.

7. A method in accordance with claim 1, wherein said step of adapting said covariance matrix representation of elements by averaging values along a diagonal to obtain said Toeplitz matrix representation of elements comprises the steps of:

computing an average value for each diagonal in said covariance matrix, each diagonal comprising at least one element value; and replacing each element value in each diagonal with said computed average value for each respective diagonal.

8. A method in accordance with claim 1, further comprising the step of adaptively calculating weight vectors in accordance with said Toeplitz matrix representation of elements.

9. A system for processing received sensor array signals indicative of correlated contacts, said system comprising:

a covariance calculator for forming a covariance matrix representation of elements associated with said received sensor array signals;

a processor for adapting said covariance matrix representation of elements by averaging values along a diagonal thereof to obtain a Toeplitz matrix representation of elements; and a response signal processor for processing said Toeplitz matrix representation of elements to obtain a response signal indicative of a location of at least one of said correlated contacts.

10. A system in accordance with claim 9, wherein said Toeplitz matrix representation of elements is a least squares approximation of said covariance matrix.

11. A system in accordance with claim 9, wherein said response signal is a bearing response signal.

12. A system in accordance with claim 9, wherein said sensor array comprises one of an array of acoustic sensors, an array of electromagnetic sensors, and an array of optical sensors.

13. A system in accordance with claim 9, wherein said processor computes a replacement value for each diagonal in said covariance matrix, each diagonal comprising at least one element value, wherein said processor replaces each element value in each diagonal with said computed replacement value for each respective diagonal.

14. A system in accordance with claim 9, said processor further comprising a diagonal averager for computing an average value for each diagonal in said covariance matrix, each diagonal comprising at least one element value, and wherein each element value in each diagonal is replaced with said computed average value for each respective diagonal.

15. A system in accordance with claim 9, wherein said response signal processor adaptively calculates weight vectors in accordance with said Toeplitz matrix representation of elements.

16. A computer readable medium having embodied thereon a computer program for causing a computer to process received sensor array signals indicative of correlated contacts, said computer readable program comprising:

means for causing said computer to form a covariance matrix representation of elements associated with said received sensor array signals;

means for causing said computer to adapt said covariance matrix representation of elements by averaging values along a diagonal thereof to obtain a Toeplitz matrix representation of elements; and means for causing said computer to process said Toeplitz matrix representation of elements to obtain a response signal indicative of a location of at least one of said correlated contacts.

17. A computer readable medium in accordance with claim 16, wherein said Toeplitz matrix representation of elements is a least squares approximation of said covariance matrix.

18. A computer readable medium in accordance with claim 16, wherein said response signal is a bearing response signal.

19. A computer readable medium in accordance with claim 16, wherein said computer program further comprises means for causing said computer to equate an expected value of an amplitude of a received sensor array signal corresponding to each of said correlated contacts to unity.

20. A computer readable medium in accordance with claim 16, wherein said sensor array comprises one of an array of acoustic sensors, an array of electromagnetic sensors, and an array of optical sensors.

21. A computer readable medium in accordance with claim 16, wherein said computer program further comprises:

means for causing said computer to compute a replacement value for each diagonal in said covariance matrix, each diagonal comprising at least one element value; and means for causing said computer to replace each element value in each diagonal with said computed replacement value for each respective diagonal.

22. A computer readable medium in accordance with claim 16, wherein said computer program further comprises:

means for causing said computer to compute an average value for each diagonal in said covariance matrix, each diagonal comprising at least one element value; and means for causing said computer to replace each element value in each diagonal with said computed average value for each respective diagonal.

23. A computer readable medium in accordance with claim 16, wherein said computer program further comprises means for causing said computer to adaptively calculate weight vectors in accordance with said Toeplitz matrix.

24. A method for calculating a response signal indicative of a location of a least one of a plurality of correlated contacts from received sensor array signals, said method comprising the steps of:

forming a covariance matrix representation of elements associated with said received sensor array signals;

adapting said covariance matrix to obtain an adapted matrix representation of elements having a cross product component approximately equal to zero; and processing said adapted matrix to obtain said response signal.

25. A method in accordance with claim 24, wherein said step of adapting said covariance matrix further comprises the steps of:

computing a replacement value for each diagonal in said covariance matrix; and replacing each element value in each diagonal with said computed replacement value for each respective diagonal.

26. A method in accordance with claim 24, wherein said step of adapting said covariance matrix further comprises the steps of:

computing an average value for each diagonal in said covariance matrix; and replacing each element value in each diagonal with said computed average value for each respective diagonal.

27. A method in accordance with claim 24, wherein said adapted matrix is a Toeplitz matrix.

28. A method for processing received sensor array signals indicative of correlated contacts, said method comprising:

forming a covariance matrix representation of elements associated with said received sensor array signals;

forming a Toeplitz matrix representation of elements based on the element values of the covariance matrix but independent of the form of the covariance matrix; and processing said Toeplitz matrix representation of elements to obtain a response signal indicative of a location of at least one of said correlated contacts.

29. A method for processing received sensor array signals indicative of correlated contacts, said method comprising:

forming a covariance matrix representation of elements associated with said received sensor array signals;

modifying element values of the covariance matrix based on an approximation of the values associated with the covariance matrix along a diagonal thereof to obtain a Toeplitz matrix representation of elements; and processing said Toeplitz matrix representation of elements to obtain a response signal indicative of a location of at least one of said correlated contacts.

* * * * *